United States Patent
Fukudome

(10) Patent No.: US 7,647,371 B2
(45) Date of Patent: Jan. 12, 2010

(54) DATA PROCESSING SYSTEM INCLUDING DATA TRANSMISSION APPARATUS, DATA STORAGE APPARATUS AND CLIENT APPARATUS

(75) Inventor: Naobumi Fukudome, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 636 days.

(21) Appl. No.: 11/000,059

(22) Filed: Dec. 1, 2004

(65) Prior Publication Data

US 2005/0144227 A1    Jun. 30, 2005

(30) Foreign Application Priority Data

Dec. 9, 2003    (JP) .............................. 2003-411059

(51) Int. Cl.
*G06F 15/16* (2006.01)
(52) U.S. Cl. ....................... 709/203; 709/201; 709/202; 709/208
(58) Field of Classification Search .......... 709/203–206
See application file for complete search history.

(56) References Cited

U.S. PATENT DOCUMENTS

2003/0061520 A1* 3/2003 Zellers et al. ............... 713/202
2004/0107257 A1* 6/2004 Inoue et al. ................. 709/206

FOREIGN PATENT DOCUMENTS

| JP | 2002-236643 | 8/2002 |
| JP | 2003-178009 | 6/2003 |
| WO | WO 97/38510 | 10/1997 |

OTHER PUBLICATIONS

Partial translation of Jun. 2, 2009 Japanese Official Action in Japanese Patent Appln. No. 2003-411095.

* cited by examiner

*Primary Examiner*—William C Vaughn, Jr.
*Assistant Examiner*—Maceeh Anwari
(74) *Attorney, Agent, or Firm*—Fitzpatrick, Cella, Harper & Scinto

(57) ABSTRACT

In a data processing system, a document transmission apparatus capable of transmitting acquired data, a computer system including a data management unit for storing and managing data and a data storage unit for performing a process of causing to store the data transmitted from the document transmission apparatus in the data management unit, and an information processing terminal to be used by a user are connected through a network. In this system, the data storage unit comprises a storage destination acquisition unit adapted to acquire storage destination information of the data stored by the data management unit, from the data management unit, and a notification unit adapted to transmit, to the information processing terminal, a notification to which the storage destination information acquired by the storage destination acquisition unit has been added. Thus, it is possible to reduce a load on the network and improve security.

17 Claims, 4 Drawing Sheets

FIG. 4

| USER ID | PASSWORD | MAIL ADDRESS |
|---------|----------|--------------|
| USER A | PASSWORD A | user-a@xxxx.co.jp |
| USER B | PASSWORD B | user-b@xxxx.co.jp |
| USER C | PASSWORD C | user-c@xxxx.co.jp |
| . . . | . . . | . . . |

FIG. 5

| DESTINATION NAME | MAIL ADDRESS 501 | STORAGE LOCATION | PROTOCOL |
|------------------|------------------|------------------|----------|
| DESTINATION A | user-a@xxxx.co.jp<br>user-c@xxxx.co.jp | Cabinet1¥folder1 | FTP |
| DESTINATION B | user-a@xxxx.co.jp<br>user-b@xxxx.co.jp | Cabinet1¥folder2 | FTP |
| DESTINATION C | user-b@xxxx.co.jp<br>user-c@xxxx.co.jp | Cabinet1¥folder3 | FTP |
| . . . | . . . | . . . | . . . |

DATA PROCESSING SYSTEM INCLUDING DATA TRANSMISSION APPARATUS, DATA STORAGE APPARATUS AND CLIENT APPARATUS

BACKGROUND OF THE INVENTION

1. Field of the Invention

The present invention relates to a data processing system and a data processing method. More specifically, the present invention relates to a data processing system which includes a data transmission apparatus capable of transmitting acquired data, a data storage apparatus for storing received data, an a client apparatus for acquiring the data stored in the data storage apparatus, a data storage method which is applicable to the data storage apparatus in the data processing system, a recording medium which stores a program to achieve the data storage method, and the program itself.

2. Related Background Art

In a conventional data storage system which stores data of documents and images, a URL (Uniform Resource Locator) of a document stored in a box (memory) of an apparatus such as a multifunction device or the like having a scan function and a facsimile reception function is directly notified to a user by an electronic mail, or a URL of a document temporarily stored based on a document storage application up and running in a computer is notified to a user. Besides, for example, a URL of an image stored from a device such as a digital camera into a web server is notified to a user by the web server through an electronic mail (e.g., International Publication No. WO 97/38510).

However, in the conventional data storage system described as above, in the case where the document is stored in the box of the apparatus or the document is stored based on the document storage application, because the capacity of the box of the apparatus or the capacity of the document storage area for the document storage application is limited, it is necessary for the user to extract the document stored in the box or to transfer the document to a document management application up and running in another computer, whereby traffic of a communication network increases.

Further, in the case where the image is stored in the web server, when it is constructed that a web server option is added to the document storage application, it cannot cope with a case where there is no web server. That is, when there is no web server, a useless mail having no URL is delivered to the user.

Furthermore, in the case where the image is stored in the web server, the mail is transmitted to the user stored in the web server or to the partner designated by the stored user. That is, access authority of the destination to which the image is stored is not considered.

Thus, the load on the communication network concerning transmission/reception of the stored documents, the stored images and the like is large, and security is weak, whereby there is still room for improvement in the above related background art.

SUMMARY OF THE INVENTION

An object of the present invention is to provide a data processing system which eliminates such conventional problems as described above.

The feature of the present invention is to provide a data processing system which reduces a load on a communication network.

Moreover, the feature of the present invention is to provide a data processing system which improves security.

Other objects and features of the present invention will become apparent from the following description in conjunction with the accompanying drawings.

BRIEF DESCRIPTION OF THE DRAWINGS

FIG. 4 is a view showing a table of login information of the document storage application to the document management application when the document is stored, in the embodiment of the present invention;

FIG. 5 is a view showing a table of destination information of the document storage application when the document is stored, in the embodiment of the present invention.

DETAILED DESCRIPTION OF THE PREFERRED EMBODIMENTS

Hereinafter, the embodiments of the present invention will be described in detail with reference to the attached drawings. Here, it should be noted that the portion having the same function in the respective drawings is denoted by the same numeral, and the explanation of the later-appeared portion will be omitted therefore.

(Structure Of Apparatus)

Figure 1:
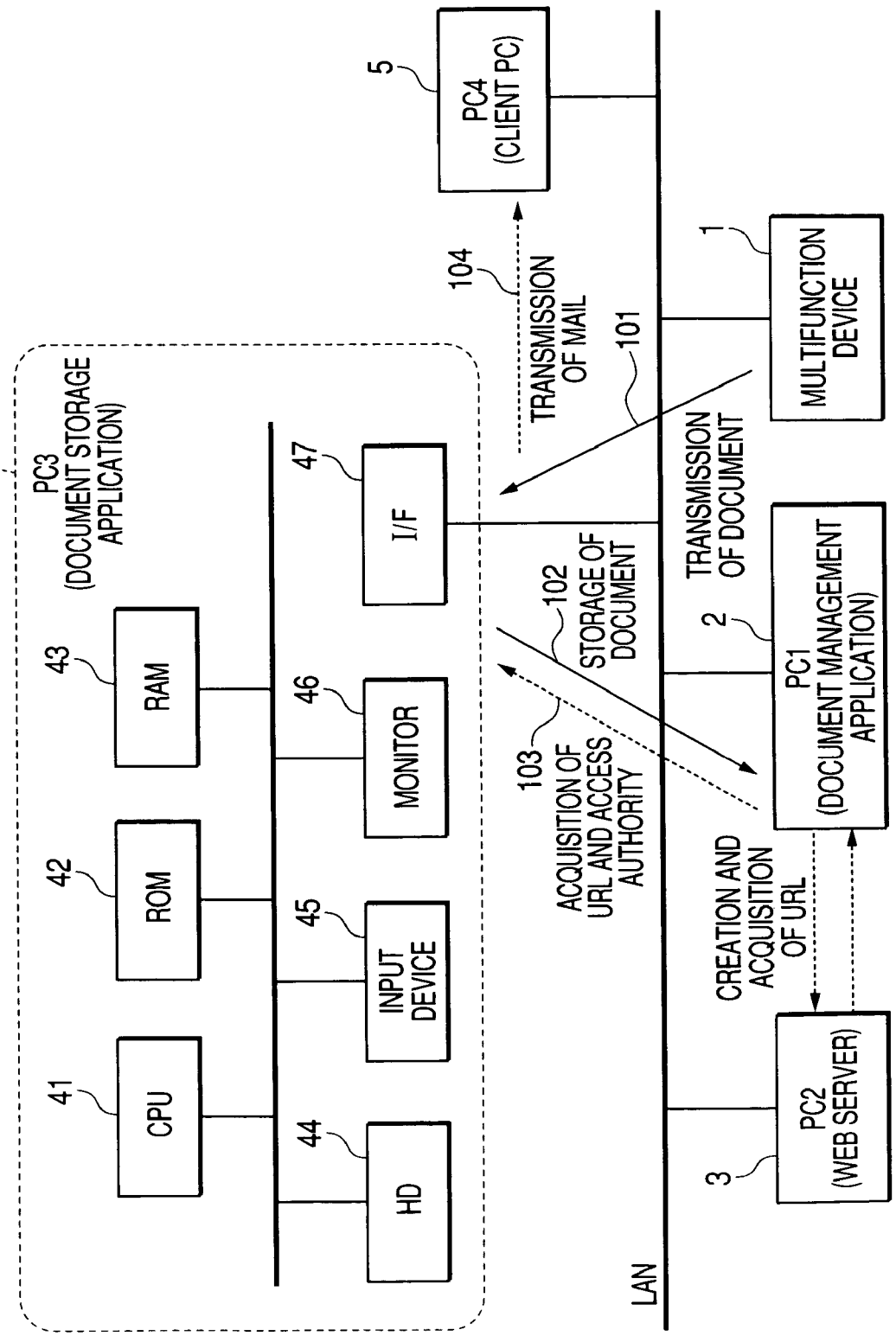
FIG. 1 is a block diagram showing the structure of a data storage system in the embodiment of the present invention.

FIG. 1 is a block diagram showing the structure of a data storage system according to the present embodiment. In FIG. 1, numeral 1 denotes a multifunction device which has a scanning function, a FAX reception function and a network transmission/reception function, which includes a function of transmitting data of documents and images (hereinafter, the above data is simply called the "document" for the sake of convenience), captured by a scanning operation, received by the FAX reception, or received through a network, to the document storage application through a communication network. Numeral 2 denotes a PC1 (personal computer) on which the document management application used for storing and managing the document sent from the multifunction device 1 operates. Numeral 3 denotes a PC2 on which a WEB server operates when a WEB option is added. Numeral 4 denotes a PC3 on which the document storage application operates. Numeral 5 denotes a PC4 (client PC) which receives a URL of the stored document transmitted from the document storage application, which is used for browsing and downloading that document by a user. It should be noted that plural multifunction devices and plural personal computers to be used by users can be connected on the network, and the plural multifunction devices can transmit data to the personal computers having the document storage application and the plural client personal computers can browse the document.

The document storage application operating on the PC3 denoted by the numeral 4 has the function of storing the document transmitted from the multifunction device 1 (101 in FIG. 1) in the document management application operating on the PC1 (102 in FIG. 1), acquiring the URL of the stored document from the WEB server via the document management application, acquiring the access authority to the stored document every user from the document management application (103 in FIG. 1), and transmitting the URL to the only user holding the access authority by a mail (E-mail) (104 in FIG. 1).

Figure 2:
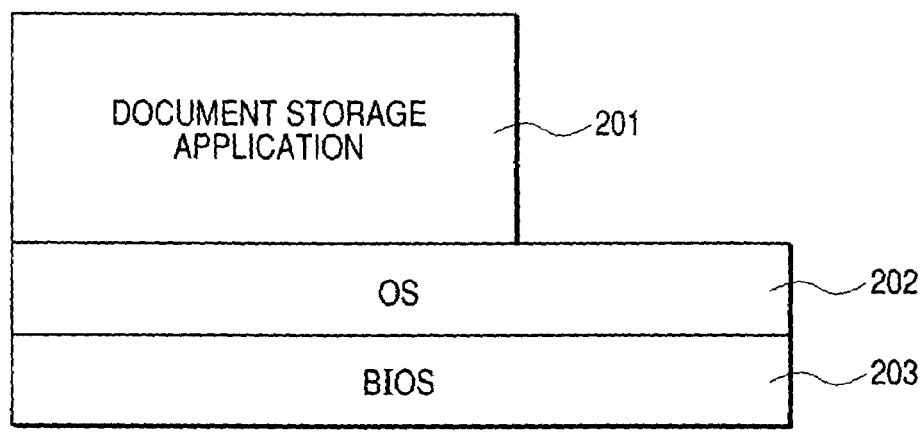
FIG. 2 is a structural view of the software operating on a PC3 (personal computer 3) in the embodiment of the present invention.
Figure 3:
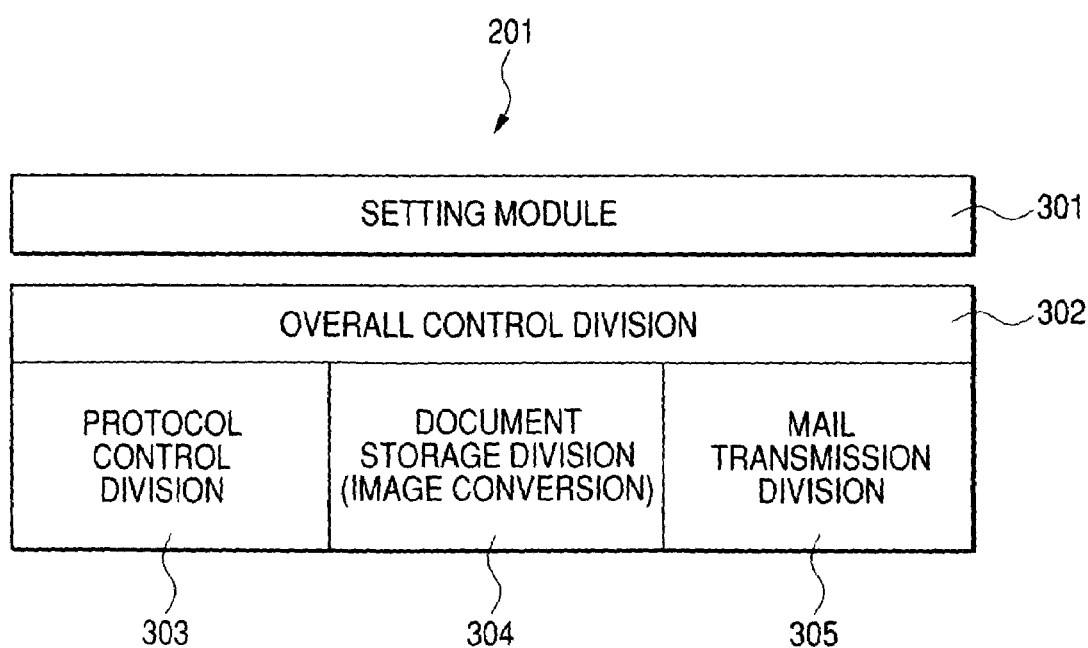
FIG. 3 is a module structural view of the document storage application in the embodiment of the present invention.
Figure 6:
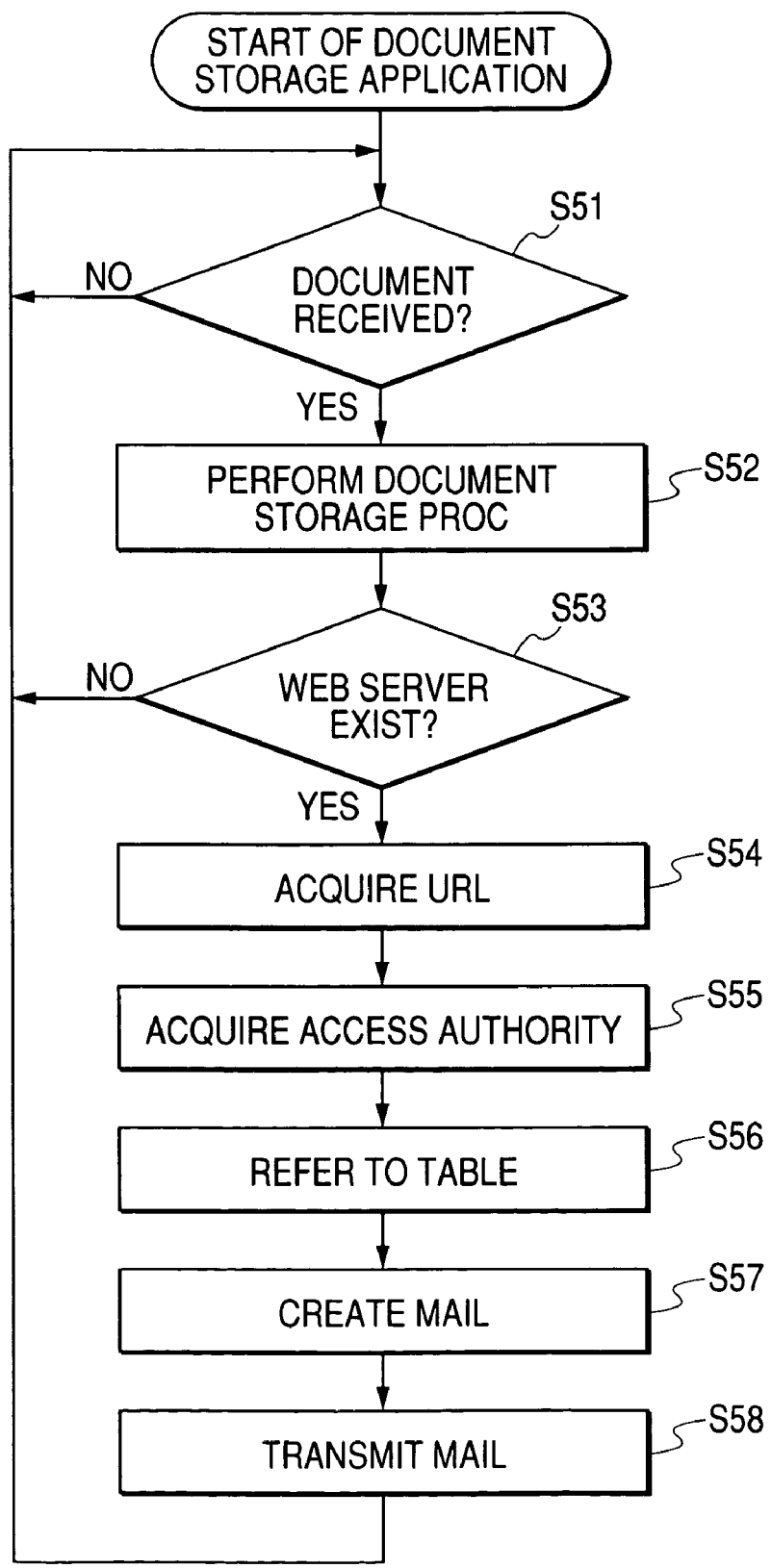
FIG. 6 is a flowchart showing the procedure of transmitting a URL to a user by a mail (E-Mail) when the document is stored, in the embodiment of the present invention.

Numeral 41 in the PC3 shown in FIG. 1 denotes a CPU which executes a document storage process by using the software shown in FIG. 2 and the document storage application shown in FIG. 3 or which executes a process, in the procedure shown in FIG. 6, of transmitting the URL of the stored document to the user by the mail. Numeral 42 in the PC3 denotes a ROM (read only memory) in which the basic software such as a BIOS (Basic Input/Output System) or the like shown in FIG. 2 is stored. Numeral 43 in the PC3 denotes a RAM (random access memory) which temporarily loads the software shown in FIG. 2 or 3 from a hard disk (HD) 44 and is used to enable the CPU 41 to execute the software. Numeral 44 denotes the HD which stores an OS (operating system) shown in FIG. 2, the document storage application shown in FIG. 3, various data necessary for processes, tables and the like. Numeral 45 in the PC3 denotes an input device which is used to operate a UI (user interface) in a case of executing the software shown in FIG. 2 or 3. Numeral 46 in the PC3 denotes a monitor which is used to display the UI, an execution status or the like of the software shown in FIG. 2 or 3. Numeral 47 in the PC3 denotes a communication network I/F (interface) which is used to connect the PC3 to a LAN.

In the present embodiment, it is assumed that the LAN is used as an example of a communication network and a FTP (file transfer protocol) is used as a protocol of the data transfer. As the WEB option of the document management application, for example, a WEB server of IIS (Internet Information Server) of the Windows™ 2000 server is used, and a URL is created as linkage information of the document stored in the document management application. In the present embodiment, it is assumed that the document management application and the WEB option are respectively operating on different servers. Sequential processes, to be described later, such as an image data conversion process when the document of the document storage application is stored, the user authentication to the document management application, a process of storing the document, and the like may be the processes similar to the prior art known to the person skilled in the art.

FIG. 2 is a structural view of the software operating on the PC3 in the present embodiment. An operating control of the hardware of each of the structural members in the PC3 is performed by a BIOS 203 and an OS 202. A communication on the LAN is performed by use of, for example, TCP/IP (Transmission Control Protocol/Internet Protocol), and the handling of that protocol is performed by the OS. A document storage application 201 has functions of communicating with the multifunction device 1 and storing the document.

FIG. 3 is a structural view of the document storage application 201. A protocol control division 303 performs the transmission/reception of the document between the document storage application 201 and the multifunction device 1 by using, for example, a protocol such as FTP. A document storage division 304 can store the document transferred from the protocol control division 303 in a desired storage destination of the document management application operating on the PC1. At that time, the image data conversion process is executed in accordance with the destination when the document is stored in the document management application.

At that time, the document storage division 304 acquires the URL of the stored document from the WEB server operating on the PC2 via the document management application and further acquires the access authority to the document for every user from the document management application, and then creates a list of a mail of including the URL and a user who transmits the mail in accordance with the acquired information. Thereby, the mail can be transmitted. An overall control division 302 manages the transference of the document from the protocol control division 303 to the document storage division 304 and an operating condition (success in reception, success in storage, error and the like) of the protocol control division 303 or the document storage division 304 and performs a notification of error to the user when the error occurs.

FIG. 4 is a view showing a table of login information which collectively holds the login information such as user IDs, passwords or the like used in case of storing the document in the document management application operating on the PC1 from the document storage application 201 and addresses of the users used in transmitting the mail. The table of login information is previously held by the PC3 and is managed by the document storage application 201.

FIG. 5 is a view showing a table of destination information of the document storage application 201 when the document is stored in the document management application. This table includes destination names, paths of the storage destinations, addresses when transmitting the mail, and the protocol to be used. The document storage application 201 creates a list of the user who transmits the URL on the basis of the table of destination information, the table of login information shown in FIG. 4 and the access authority to the actually stored document every user. The table of destination information is previously held by the PC3 and is managed by the document storage application 201. The access authority to the stored document for every user is previously held by the PC1 and is managed by the document management application.

In the table of destination information shown in FIG. 5, an ID and a password of the login user when the document is stored are associated with each other for every destination and an image data conversion process of the document for every destination is also associated with the ID and the password. A setting module 301 shown in FIG. 3 can set whether or not the destination information, the ID and the password of the login user, the image data conversion process and the URL are transmitted by the mail, and can set which user is sent with these information in case of transmitting the mail.

(Explanation Of Operation)

FIG. 6 is a flowchart showing a processing procedure in the present embodiment of transmitting the URL to the user having the access authority to the stored document only in a case that the WEB server exists by checking existence of the WEB server by the document storage application 201 when the document is stored. This processing procedure is executed by loading the document storage application 201 in the RAM 43 by the CPU 41 of the PC3 denoted by the numeral 4 shown in FIG. 1. Hereinafter, the document storage in a data storage system, the delivering of the URL at a storage destination and the user authentication according to the present embodiment will be explained with reference to FIG. 6.

Initially, in the CPU 41 of the PC3, a status of waiting for reception of the document from the multifunction device 1 is kept in a step S51. Here, when the CPU 41 receives the document, a flow advances to a step S52, where an ordinary document storage process, that is, a sequential process of executing the image data conversion process in accordance with the destination added to the transferred document when the document is stored in the document management application, performing the login to the document management application and storing the document in a path of the storage destination, is executed.

Next, in a step S53, the CPU 41 acts such that a parameter which indicates whether or not the WEB server exists is returned from information of the WEB option managed by the document management application as a return value from the document management application in the PC1 when the document storage process is executed. When the WEB server does not exist, the CPU 41 acts to return the process to the step S51, wherein the status of waiting for reception of the stored document is kept again.

When the WEB server exists, the flow advances to a step S54, where the CPU 41 acquires a URL which is created by the WEB server, of the just stored document via the document management application. Further, the CPU 41 acquires the access authority to the just stored document for every user from the document management application in a step S55.

Next, in a step S56, the CPU 41 compares a mail address of the table of login information of a user having the access authority to the document with a mail address included in the table of destination information with reference to the table of login information to the document management application shown in FIG. 4 and the table of destination information shown in FIG. 5 and creates a list of the mail address of the user who transmits the URL. For example, as indicated by numeral 501 shown in FIG. 5, a process, wherein the document transferred to a destination A is stored, and when the access authority to the document exists on only the side of a user A, a mail address of a user C is written for the destination A, however only the address of the user A is included in the list of the mail address of the user who transmits the URL, is executed.

In a step S57, the CPU 41 adds the acquired URL to the previously prepared mail text and creates a mail in which the address in the list of the mail address is set to the transmission destination and then the formed mail is transmitted in a step S58. Thereafter, the CPU 41 acts to return the process again to the step S51, where a status of waiting for reception of the stored document is kept.

Another Embodiment

The following embodiments can be performed besides the above embodiment.

1) In the above embodiment, although the document management application and the WEB option respectively operate on different computers as shown in FIG. 1, those may operate on the same computer.
2) In the above embodiment, although the document storage application and the document management application respectively operate on different computers as shown in FIG. 1, those may operate on the same computer.
3) In the processing procedure shown in FIG. 6, when, in the step S53, the WEB server does not exist, the CPU 41 acts to skip the process to the step S55, and a mail not including the URL is transmitted in the step S57. Thereby, that transmission may be regarded as a notification of terminating the document storage.
4) As another situation, an apparatus for executing the above process may be properly modified or combined with another apparatus.
5) The present invention also includes a case where the program codes of software for realizing the functions of the above embodiment are supplied to an apparatus connected to the various devices or a computer in a system so as to operate the various devices to realize the functions of the above embodiment, and the functions are realized by operating the various devices in accordance with the programs stored in the computer (or CPU or MPU) in the system or the apparatus.
6) In this case, the program codes themselves of the software realize the functions of the above embodiment, and the program codes themselves and the means for supplying the program codes to the computer, for example, a storage medium storing such the program codes constitute the present invention.
7) As the storage medium for storing the program codes, for example, a floppy™ disk, a hard disk, an optical disk, a magnetooptical disk, a CD-ROM, a magnetic tape, a nonvolatile memory card, a ROM or the like can be used.
8) It is needless to say that such the program codes are included in the embodiment of the present invention not only in a case where the functions of the above embodiment are realized by the execution of the program codes supplied to the computer, but also in a case where the functions of the above embodiment are realized by such program codes which cooperate with an OS (operating system) functioning on the computer, another application software or the like.
9) Further, it is needless to say that the present invention includes a case where the supplied program codes are once stored in a memory provided in a function expansion board inserted in the computer or a function expansion unit connected to the computer, then a CPU or the like provided in the function expansion board or the function expansion unit executes all the process or a part thereof according to the instructions of such the program codes, thereby realizing the functions of the above embodiment.
10) The same functions may be realized by using the software or separately and properly using the hardware and the software.

Specific Effects Of Embodiments

In the present embodiment, since a user downloads only the necessary document after confirming the document instructed by the URL by transferring only the URL of the stored document from the document storage application to the user, the load in a communication network can be decreased. For example, in a case that the WEB option is not added or a WEB server is not yet activated, since a mail is not transmitted, the load in a communication network can be decreased. Otherwise, in this case, by transmitting a mail not including the URL, that transmission can be regarded as a notification of terminating the document storage. Further, an access control can be performed for the stored document by transmitting the URL by the mail to only the user who can access to the stored document among users in the mail transmitting destinations set in the destination information.

According to the above-explained embodiments, in a data storage system, an effect of suppressing the unnecessary delivering on a communication network is obtained for the stored document or image.

Further, in the data storage system, an effect of performing an access control to the stored document or image is obtained.

Although the above embodiments have been explained in order to show examples of the present invention, the present invention can be modified besides the above embodiments. As long as the modification is based on the technical idea of the present invention mentioned within the scope of the appended claims, the modification is included in a technical field of the present invention.

This application claims priority from Japanese Patent Application No. 2003-411059 filed on Dec. 9, 2003, which is hereby incorporated by reference herein.

What is claimed is:

1. A data processing system comprising (a) a document transmission apparatus capable of transmitting data, (b) a computer system including a data management unit for storing and managing the data transmitted by said document transmission apparatus in a plurality of storage destinations and a data storage unit for performing a process of causing storage of the data transmitted from said document transmission apparatus in said data management unit, and (c) an information processing terminal to be used by a user, wherein said document transmission apparatus, said computer system, and said information processing terminal are connected through a network, and wherein said data storage unit comprises:

a holding unit that holds, in a memory of said data storage unit, an identifier indicating a notification destination of the user to which a notification can be performed, so as to correspond to each of storage destinations of storing the data by said data management unit, before the data to be stored to the storage destinations is transmitted from said document transmission apparatus to said computer system, a storage destination acquisition unit that acquires storage destination information of the data stored by said data management unit, from said data management unit when the data transmitted by said document transmission apparatus is stored to one of the storage destinations corresponding to the acquired storage destination information, and a notification unit that specifies, in response to the data from said document transmission apparatus being stored to one of the storage destinations, a notification destination corresponding to the storage destination which is indicated by the storage destination information acquired by said storage destination acquisition unit by referring to the identifier held by said holding unit, and to transmit, through the network to said information processing terminal based on the specified notification destination, a notification to which the storage destination information acquired by said storage destination acquisition unit has been added, the notification to be notified by said notification unit indicating that the data has been stored to the storage destination corresponding to the acquired storage destination information, wherein said holding unit holds in a table in said memory of said data storage unit, for each of the storage destinations, at least one said identifier indicating the notification destination of the user to which a notification can be performed, wherein when said holding unit holds, for a storage destination of the storage destinations, a plurality of said identifiers, said notification unit uses the table to obtain the notification destination by selecting one of the plurality of identifiers.

2. A data processing system according to claim 1, wherein said data storage unit further comprises a judgment unit that judges whether or not said data management unit can generate the storage destination information, and wherein when it is judged by said judgment unit that said data management unit can generate the storage destination information, the storage destination information is acquired by said storage destination acquisition unit, and the acquired storage destination information is notified by said notification unit.

3. A data processing system according to claim 1, wherein said data storage unit further comprises an access authority acquisition unit that acquires from said data management unit an access authority of each user to the data stored by said data management unit, and wherein the notification is transmitted by said notification unit to the user who has the access authority acquired by said access authority acquisition unit and whose identifier corresponding to the storage destination of the data stored by said data management unit is held by said holding unit.

4. A data processing system according to claim 1, wherein said document transmission apparatus transmits to said data management unit the data acquired by reading an image on an original.

5. A data processing system according to claim 1, wherein said document transmission apparatus transmits to said data management unit the data acquired by reception from another apparatus.

6. A data processing system according to claim 1, wherein said computer system comprises a first computer which is equipped with said data management unit, and a second computer which is connected to said first computer through the network and is equipped with said data storage unit.

7. A data storage method for a data storage system comprising a document transmission apparatus capable of transmitting acquired data, a first computer for storing and managing data, a second computer for performing a process of causing the first computer to store the data transmitted from the document transmission apparatus in a plurality of storage destinations, and a third computer to be used by a user, wherein the document transmission apparatus, the first computer, the second computer, and the third computer are connected through a network, and wherein the second computer executes a method comprising:

a holding step of holding, in a memory of the second computer, an identifier indicating a notification destination of the user to which a notification can be performed, so as to correspond to each of storage destinations of storing the data by the first computer, before the data to be stored to the storage destinations is transmitted from the document transmission apparatus to the second computer, a storage destination acquisition step of acquiring storage destination information of the data stored by the first computer, from the first computer when the data transmitted by the document transmission apparatus is stored to one of the storage destinations corresponding to the acquired storage destination information, and a notification step of specifying, in response to the data from the document transmission apparatus being stored to one of the storage destinations, a notification destination corresponding to the storage destination which is indicated by the storage destination information acquired in said storage destination acquisition step by referring to the identifier held by said holding step, and transmitting, through the network to the third computer based on the specified notification destination, a notification to which the storage destination information acquired in said storage destination acquisition step has been added, the notification to be notified by said notification step indicating that the data has been stored to the storage destination corresponding to the acquired storage destination information, wherein said holding step holds in a table in the memory, for each of the storage destinations, at least one said identifier indicating the notification destination of the user to which a notification can be performed, wherein when said holding step holds, for a storage destination of the storage destinations, a plurality of said identifiers, said notification step uses the table to obtain the notification destination by selecting one of the plurality of identifiers.

8. A data storage method according to claim 7, wherein the second computer further executes a judgment step of judging whether or not the first computer can generate the storage destination information, and wherein when it is judged in said judgment step that the first computer can generate the storage destination information, the storage destination information is acquired in said storage destination acquisition step, and the acquired storage destination information is notified in said notification step.

9. A data storage method according to claim 7, wherein the second computer further executes an access authority acquisition step of acquiring from the first computer an access authority of each user to the data stored by the first computer, and wherein the notification is transmitted in said notification step to the user who has the access authority acquired in said access authority acquisition step and whose identifier corresponding to a storage destination of the data stored by the first computer is held in the first computer.

10. A data storage method for a data storage system comprising a document transmission apparatus capable of transmitting acquired data, a first computer for performing a data management process for storing and managing data and a process for causing storage of the data transmitted from the document transmission apparatus in a plurality of storage destinations, and a second computer to be used by a user, wherein the document transmission apparatus, the first computer, and the second computer are connected through a network, said method comprising:

a holding step of holding, in a memory of the first computer, an identifier indicating a notification destination of the user to which a notification can be performed, so as to correspond to each of storage destinations of storing the data by the first computer, before the data to be stored by to the storage destinations is transmitted from the document transmission apparatus to the first computer, a discrimination step of discriminating storage destination information in case of storing the data transmitted from the document transmission apparatus to the first computer when the data transmitted by the document transmission apparatus is stored to one of the storage destinations corresponding to the acquired storage destination information; and a notification step of specifying, in response to the data from the document transmission apparatus being stored to one of the storage destinations, a notification destination corresponding to the storage destination discriminated in said discriminating step by referring to the identifier held by said holding step is stored to the first computer, and transmitting, to the second computer through the network, a notification to which the storage destination information discriminated in said discrimination step has been added, the notification to be notified by said notification step indicating that the data has been stored to the storage destination corresponding to the acquired storage destination information, wherein said holding step holds in a table in the memory, for each of the storage destinations, at least one said identifier indicating the notification destination of the user to which a notification can be performed, wherein when said holding step holds, for a storage destination of the storage destinations, a plurality of said identifiers, said notification step uses the table to obtain the notification destination by selecting one of the plurality of identifiers.

11. A program, which is stored in a storage medium and executable by a second computer, for achieving a data storage method for a data storage system comprising a document transmission apparatus capable of transmitting acquired data, a first computer for storing and managing data, a second computer for performing a process of causing the first computer to store the data transmitted from the document transmission apparatus in a plurality of storage destinations, and a third computer to be used by a user, wherein the document transmission apparatus, the first computer, the second computer, and the third computer are connected through a network, said method comprising:

a holding step of holding, in a memory of the second computer, an identifier indicating a notification destination of the user to which a notification can be performed, so as to correspond to each of storage destinations of storing the data by the first computer, before the data to be stored to the storage destinations is transmitted from the document transmission apparatus to the second computer, a storage destination acquisition step of acquiring storage destination information of the data stored by the first computer, from the first computer when the data transmitted by the document transmission apparatus is stored to one of the storage destinations corresponding to the acquired storage destination information; and a notification step of specifying, in response to the data from the document transmission apparatus being stored to one of the storage destinations, a notification destination corresponding to the storage destination which is indicated by the storage destination information acquired in said storage destination acquisition step by referring to the identifier held by said holding step, and transmitting, through the network to the third computer based on the specified notification destination, a notification to which the storage destination information acquired in said storage destination acquisition step has been, the notification to be notified by said notification step indicating that the data has been stored to the storage destination corresponding to the acquired storage destination information, wherein said holding step holds in a table in the memory, for each of the storage destinations, at least one said identifier indicating the notification destination of the user to which a notification can be performed, wherein when said holding step holds, for a storage destination of the storage destinations, a plurality of said identifiers, said notification step uses the table to obtain the notification destination by selecting one of the plurality of identifiers.

12. A program, which is stored in a storage medium and executable by a first computer, for achieving a data storage method for a data storage system comprising a document transmission apparatus capable of transmitting acquired data, a first computer of performing a data management process for storing and managing data and a process for causing storage of the data transmitted from the document transmission apparatus in a plurality of storage destinations, and a second computer to be used by a user, wherein the document transmission apparatus, the first computer, and the second computer are connected through a network, said method comprising:

a holding step of holding, in a memory of the first computer, an identifier indicating a notification destination of the user to which a notification can be performed, so as to correspond to each of storage destinations of storing the data by the first computer, before the data to be stored to the storage destinations is transmitted from the document transmission apparatus to the first computer;

a discrimination step of discriminating storage destination information in case of storing the data transmitted from the document transmission apparatus to the first computer when the data transmitted by the document transmission apparatus is stored to one of the storage destinations corresponding to the acquired storage destination information; and a notification step of specifying, in response to the data from the document transmission apparatus being stored to one of the storage destinations, a notification destination corresponding to the storage destination discriminated in said discriminating step by referring to the identifier held by said holding step, and transmitting, to the second computer through the network, a notification to which the storage destination information discriminated in said discrimination step has been added, the notification to be notified by said notification step indicating that the data has been stored to the storage destination corresponding to the acquired storage destination information, wherein said holding step holds in a table in the memory, for each of the storage destinations, at least one said identifier indicating the notification destination of the user to which a notification can be performed, wherein when said holding step holds, for a storage destination of the storage destinations, a plurality of said identifiers, said notification step uses the table to obtain the notification destination by selecting one of the plurality of identifiers.

13. A data processing system comprising (a) a document transmission apparatus capable of transmitting data, (b) a computer system including a data management unit for storing and managing the data transmitted by said document transmission apparatus in a plurality of storage destinations and a data storage unit for performing a process of causing storage of the data transmitted from said document transmission apparatus in said data management unit, and (c) an information processing terminal to be used by a user, wherein said document transmission apparatus, said computer system, and said information processing terminal are connected through a network, and wherein said data storage unit comprises:

a holding unit that holds, in a memory of said data storage unit, an identifier indicating a notification destination of the user to which a notification can be performed, so as to correspond to each of storage destinations of storing the data by said data management unit, before the data to be stored to the storage destinations is transmitted from said document transmission apparatus to said computer system, a storage destination acquisition unit that acquires storage destination information of the data stored by said data management unit, from said data management unit when the data transmitted by said document transmission apparatus is stored to one of the storage destinations corresponding to the acquired storage destination information, and a notification unit that specifies, in response to the data from said document transmission apparatus being stored to one of the storage destinations, a notification destination corresponding to the storage destination which is indicated by the storage destination information acquired by said storage destination acquisition unit by referring to the identifier held by said holding unit, and to transmit, through the network to said information processing terminal based on the specified notification destination, a notification to which the storage destination information acquired by said storage destination acquisition unit has been added, the notification to be notified by said notification unit indicating that the data has been stored to the storage destination corresponding to the acquired storage destination information, wherein said holding unit holds in a table in said memory of said data storage unit, for each of the storage destinations, both (a) said identifier and (b) information identifying a protocol to be used when accessing the stored data.

14. A data storage method for a data storage system comprising a document transmission apparatus capable of transmitting acquired data, a first computer for storing and managing data, a second computer for performing a process of causing the first computer to store the data transmitted from the document transmission apparatus in a plurality of storage destinations, and a third computer to be used by a user, wherein the document transmission apparatus, the first computer, the second computer, and the third computer are connected through a network, and wherein the second computer executes a method comprising:

a holding step of holding, in a memory of the second computer, an identifier indicating a notification destination of the user to which a notification can be performed, so as to correspond to each of storage destinations of storing the data by the first computer, before the data to be stored to the storage destinations is transmitted from the document transmission apparatus to the second computer, a storage destination acquisition step of acquiring storage destination information of the data stored by the first computer, from the first computer when the data transmitted by the document transmission apparatus is stored to one of the storage destinations corresponding to the acquired storage destination information, and a notification step of specifying, in response to the data from the document transmission apparatus being stored to one of the storage destinations, a notification destination corresponding to the storage destination which is indicated by the storage destination information acquired in said storage destination acquisition step by referring to the identifier held by said holding step, and transmitting, through the network to the third computer based on the specified notification destination, a notification to which the storage destination information acquired in said storage destination acquisition step has been added, the notification to be notified by said notification step indicating that the data has been stored to the storage destination corresponding to the acquired storage destination information, wherein said holding step holds in a table in the memory, for each of the storage destinations, both (a) said identifier and (b) information identifying a protocol to be used when accessing the stored data.

15. A data storage method for a data storage system comprising a document transmission apparatus capable of transmitting acquired data, a first computer for performing a data management process for storing and managing data and a process for causing storage of the data transmitted from the document transmission apparatus in a plurality of storage destinations and a second computer to be used by a user, wherein the document transmission apparatus, the first computer, and the second computer are connected through a network, said method comprising:

a holding step of holding, in a memory of the first computer, an identifier indicating a notification destination of the user to which a notification can be performed, so as to correspond to each of storage destinations of storing the data by the first computer, before the data to be stored by to the storage destinations is transmitted from the document transmission apparatus to the first computer, a discrimination step of discriminating storage destination information in case of storing the data transmitted from the document transmission apparatus to the first computer when the data transmitted by the document transmission apparatus is stored to one of the storage destinations corresponding to the acquired storage destination information; and a notification step of specifying, in response to the data from the document transmission apparatus being stored to one of the storage destinations, a notification destination corresponding to the storage destination discriminated in said discriminating step by referring to the identifier held by said holding step is stored to the first computer, and transmitting, to the second computer through the network, a notification to which the storage destination information discriminated in said discrimination step has been added, the notification to be notified by said notification step indicating that the data has been stored to the storage destination corresponding to the acquired storage destination information, wherein said holding step holds in a table in the memory, for each of the storage destinations, both (a) said identifier and (b) information identifying a protocol to be used when accessing the stored data.

16. A program, which is stored in a storage medium and executable by a second computer, for achieving a data storage method for a data storage system comprising a document transmission apparatus capable of transmitting acquired data, a first computer for storing and managing data, a second computer for performing a process of causing the first computer to store the data transmitted from the document transmission apparatus in a plurality of storage destinations, and a third computer to be used by a user, wherein the document transmission apparatus, the first computer, the second computer, and the third computer are connected through a network, said method comprising:

a holding step of holding, in a memory of the second computer, an identifier indicating a notification destination of the user to which a notification can be performed, so as to correspond to each of storage destinations of storing the data by the first computer, before the data to be stored to the storage destinations is transmitted from the document transmission apparatus to the second computer, a storage destination acquisition step of acquiring storage destination information of the data stored by the first computer, from the first computer when the data transmitted by the document transmission apparatus is stored to one of the storage destinations corresponding to the acquired storage destination information; and a notification step of specifying, in response to the data from the document transmission apparatus being stored to one of the storage destinations, a notification destination corresponding to the storage destination which is indicated by the storage destination information acquired in said storage destination acquisition step by referring to the identifier held by said holding step, and transmitting, through the network to the third computer based on the specified notification destination, a notification to which the storage destination information acquired in said storage destination acquisition step has been, the notification to be notified by said notification step indicating that the data has been stored to the storage destination corresponding to the acquired storage destination information, wherein said holding step holds in a table in the memory, for each of the storage destinations, both (a) said identifier and (b) information identifying a protocol to be used when accessing the stored data.

17. A program, which is stored in a storage medium and executable by a first computer, for achieving a data storage method for a data storage system comprising a document transmission apparatus capable of transmitting acquired data, a first computer of performing a data management process for storing and managing data and a process for causing storage of the data transmitted from the document transmission apparatus in a plurality of storage destinations and a second computer to be used by a user, wherein the document transmission apparatus, the first computer, and the second computer are connected through a network, said method comprising:

a holding step of holding, in a memory of the first computer, an identifier indicating a notification destination of the user to which a notification can be performed, so as to correspond to each of storage destinations of storing the data by the first computer, before the data to be stored to the storage destinations is transmitted from the document transmission apparatus to the first computer;

a discrimination step of discriminating storage destination information in case of storing the data transmitted from the document transmission apparatus to the first computer when the data transmitted by the document transmission apparatus is stored to one of the storage destinations corresponding to the acquired storage destination information; and a notification step of specifying, in response to the data from the document transmission apparatus being stored to one of the storage destinations, a notification destination corresponding to the storage destination discriminated in said discriminating step by referring to the identifier held by said holding step, and transmitting, to the second computer through the network, a notification to which the storage destination information discriminated in said discrimination step has been added, the notification to be notified by said notification step indicating that the data has been stored to the storage destination corresponding to the acquired storage destination information, wherein said holding step holds in a table in the memory, for each of the storage destinations, both (a) said identifier and (b) information identifying a protocol to be used when accessing the stored data.

* * * * *